(12) United States Patent
Jain

(10) Patent No.: US 11,726,894 B2
(45) Date of Patent: Aug. 15, 2023

(54) RUNTIME ENTROPY-BASED SOFTWARE OPERATORS

(71) Applicant: SAP SE, Walldorf (DE)

(72) Inventor: Shashank Mohan Jain, Karnataka (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/400,678

(22) Filed: Aug. 12, 2021

(65) Prior Publication Data

US 2023/0048137 A1  Feb. 16, 2023

(51) Int. Cl.
*G06F 11/34* (2006.01)
*G06F 8/77* (2018.01)

(52) U.S. Cl.
CPC ............ *G06F 11/3414* (2013.01); *G06F 8/77* (2013.01); *G06F 11/3428* (2013.01)

(58) Field of Classification Search
CPC ..... G06F 11/3414; G06F 8/77; G06F 11/3428
See application file for complete search history.

(56) References Cited

U.S. PATENT DOCUMENTS

| | | | | |
|---|---|---|---|---|
| 8,661,548 B2* | 2/2014 | Shannon | ............ | G06F 11/3476 726/26 |
| 10,339,457 B2* | 7/2019 | Ryckbosch | ............ | G06N 20/00 |
| 10,409,642 B1* | 9/2019 | Tang | ..................... | G06F 9/5005 |
| 10,484,301 B1* | 11/2019 | Shukla | .................. | H04L 47/823 |
| 10,931,692 B1* | 2/2021 | Mota | .................. | H04L 63/1425 |
| 11,283,900 B2* | 3/2022 | Myers | ..................... | H04L 67/34 |
| 11,307,915 B1* | 4/2022 | Shwartz | ............... | G06F 11/0709 |
| 11,356,387 B1* | 6/2022 | Shateri | ................ | H04L 43/0876 |
| 11,360,881 B2* | 6/2022 | Gardner | ............. | G06F 11/3419 |
| 11,416,465 B1* | 8/2022 | Anwar | .................. | G06F 16/285 |
| 11,429,627 B2* | 8/2022 | Burnett | ................ | G06F 16/252 |
| 2006/0221848 A1* | 10/2006 | Lake | ..................... | G06F 11/008 370/242 |
| 2008/0301504 A1* | 12/2008 | Chen | ..................... | G06F 11/008 714/42 |
| 2008/0306798 A1* | 12/2008 | Anke | ....................... | G06F 8/61 705/7.26 |

(Continued)

*Primary Examiner* — Nicholas P Celani
*Assistant Examiner* — Wuji Chen
(74) *Attorney, Agent, or Firm* — Buckley, Maschoff & Talwalkar LLC

(57) ABSTRACT

A system may include a historical managed software system data store that contains electronic records associated with controllers and deployed workloads (each electronic record may include time series data representing performance metrics). An entropy calculation system, coupled to the historical managed software system data store, may calculate at least one historical entropy value based on information in the historical managed software system data store. A detection engine, coupled to a monitored system currently executing a deployed workload in the cloud computing environment, may collect time series data representing current performance metrics associated with the monitored system. The detection engine may then calculate a current monitored entropy value (based on the collected time series data representing current performance metrics) and (iii) compare the current monitored entropy value with a threshold value (based on the historical entropy value). Based on the comparison, a corrective action for the monitored system may be triggered.

12 Claims, 11 Drawing Sheets

(56) References Cited

U.S. PATENT DOCUMENTS

| | | | |
|---|---|---|---|
| 2011/0258621 A1* | 10/2011 | Kern | G06F 9/45558 718/1 |
| 2013/0346594 A1* | 12/2013 | Banerjee | G06F 11/3495 709/224 |
| 2014/0068053 A1* | 3/2014 | Ravi | G06F 9/5072 709/224 |
| 2017/0078442 A1* | 3/2017 | Pacella | H04L 67/62 |
| 2017/0373960 A1* | 12/2017 | Sachdev | H04L 43/08 |
| 2018/0176232 A1* | 6/2018 | Rodriguez | H04L 61/4511 |
| 2018/0287903 A1* | 10/2018 | Joshi | H04L 43/062 |
| 2018/0300621 A1* | 10/2018 | Shah | G06N 3/08 |
| 2019/0104069 A1* | 4/2019 | Kommula | H04L 47/125 |
| 2019/0324880 A1* | 10/2019 | Rose | G06F 11/327 |
| 2020/0007405 A1* | 1/2020 | Chitalia | G06F 9/5072 |
| 2020/0099773 A1* | 3/2020 | Myers | H04L 67/34 |
| 2020/0404051 A1* | 12/2020 | Guniguntala | H04L 41/5009 |
| 2021/0064588 A1* | 3/2021 | Fender | G06F 16/212 |
| 2021/0081409 A1* | 3/2021 | Rath | G06F 16/2455 |
| 2021/0089438 A1* | 3/2021 | Gardner | G06F 11/3466 |
| 2021/0119878 A1* | 4/2021 | Loftus | H04L 41/065 |
| 2021/0279102 A1* | 9/2021 | Ali | G06F 9/5088 |
| 2021/0303328 A1* | 9/2021 | Soppin | G06F 9/505 |
| 2021/0357255 A1* | 11/2021 | Mahadik | G06F 11/3006 |
| 2022/0100636 A1* | 3/2022 | Jothiprakash | G06F 11/079 |
| 2022/0121455 A1* | 4/2022 | Hoban | G06F 1/3228 |
| 2022/0129540 A1* | 4/2022 | Sheriff | G06F 21/566 |
| 2022/0214928 A1* | 7/2022 | Gupta | G06F 9/5044 |
| 2022/0215101 A1* | 7/2022 | Rioux | G06F 21/55 |

* cited by examiner

RUNTIME ENTROPY-BASED SOFTWARE OPERATORS

BACKGROUND

An enterprise may use on-premises systems and/or a cloud computing environment to run applications and/or to provide services. For example, cloud-based applications may be used to process purchase orders, handle human resources tasks, interact with customers, etc. Moreover, a cloud computer environment may provide for an automating deployment, scaling, and management of "containerized" applications. As used herein, the term "container" may refer to a stand-alone, all-in-one package for a software application (e.g., including the application binaries, plus the software dependencies and the hardware requirements needed to run, all wrapped up into an independent, self-contained unit). Kubernetes is one example of such an automated container orchestration approach that uses controllers in connection with containers.

Note that a cloud computing service provider may want to ensure that workloads deployed via containers (and other means) are operating as efficiently as possible to meet Service Level Agreements ("SLAs") and/or Service Level Objectives ("SLOs") for customers. Determining and/or predicting when workloads are not performing as intended, however, can be a difficult task — especially when a cloud computing service provider is executing a substantial number of workloads. According to embodiments described herein, the concept of entropy may be used to help detect these types of problems. It would therefore be desirable to automatically determine entropy values associated with a controller of a cloud computing environment in an efficient and accurate manner.

SUMMARY

According to some embodiments, methods and systems may facilitate an automatic determination of entropy values associated with a controller of a cloud computing environment (e.g., entropy of software operated and/or managed by the controller). The system may include a historical managed software system data store that contains electronic records associated with controllers and deployed workloads (and each electronic record may include time series data representing performance metrics). An entropy calculation system, coupled to the historical managed software system data store, may calculate at least one historical entropy value based on information in the historical managed software system data store. A detection engine, coupled to a monitored system currently executing a deployed workload in the cloud computing environment, may collect time series data representing current performance metrics associated with the monitored system. The detection engine may then calculate a current monitored entropy value (based on the collected time series data representing current performance metrics) and (iii) compare the current monitored entropy value with a threshold value (based on the historical entropy value). Based on the comparison, a corrective action for the monitored system may be triggered.

Some embodiments comprise: means for collecting, by a computer processor of a detection engine coupled to a monitored system currently executing a deployed workload in a cloud computing environment, time series data representing current performance metrics associated with the monitored system; means for calculating a current monitored entropy value based on the collected time series data representing current performance metrics; means for comparing the current monitored entropy value with a threshold value, the threshold value being based on a historical entropy value calculated based on time series data representing performance metrics in a historical managed software system data store; and based on the comparison, means for triggering a corrective action for the monitored system.

Some technical advantages of some embodiments disclosed herein are improved systems and methods associated with determining entropy values associated with a controller of a cloud computing environment in an efficient and accurate manner.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developer's specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
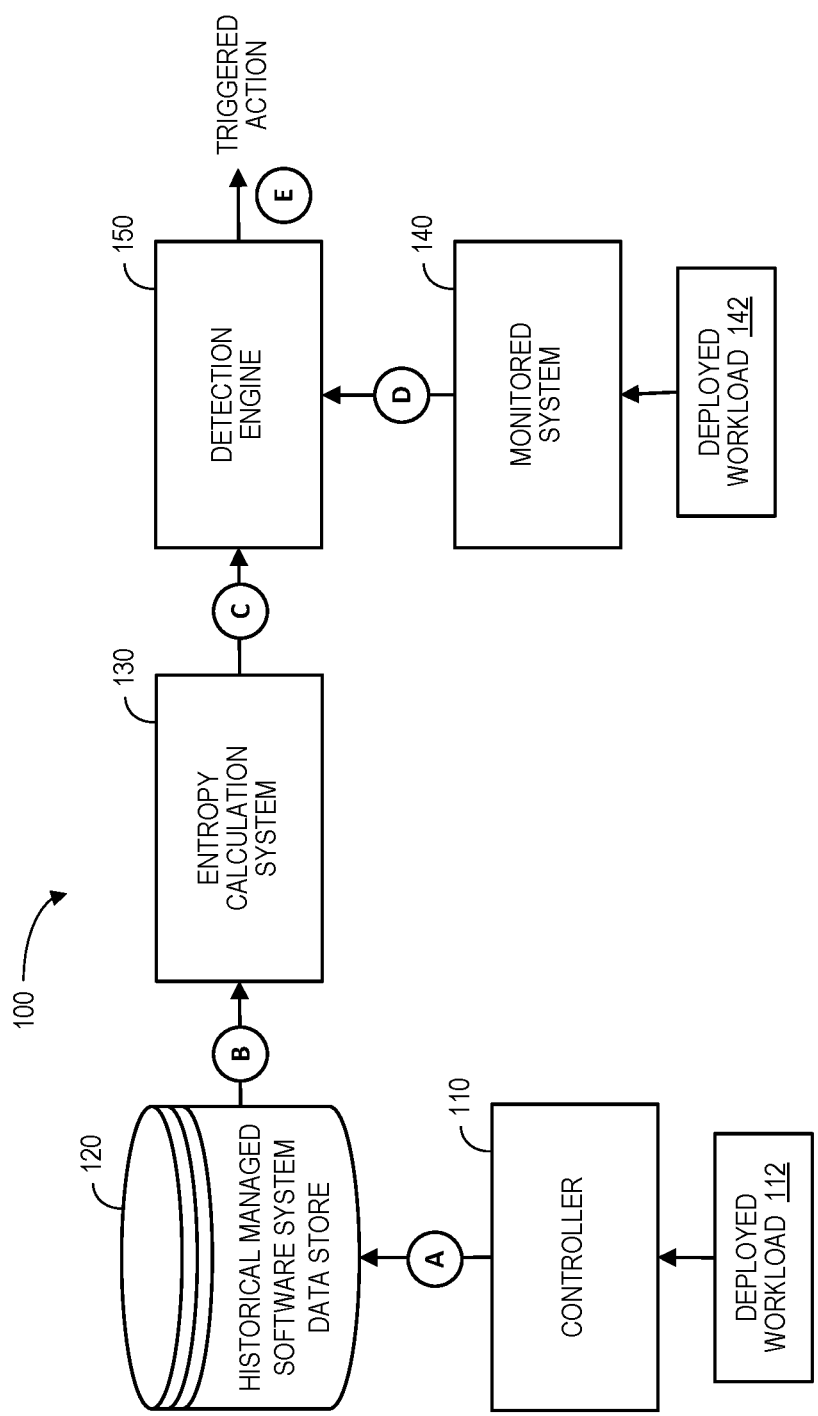
FIG. 1 is a high-level architecture for a system in accordance with some embodiments.

FIG. 1 is a high-level block diagram of a system 100 according to some embodiments. At (A), a historical managed software system 120 coupled to a controller 110 captures (e.g., via electronic records) sequences of values associated with the controller 110 and a deployed workload 112. At (B), an entropy calculation system 130 access this information and uses it to calculate at least one historic entropy value. This value is provided to a detection engine 350 at (C) which also receives data from a monitored system 140 and a deployed workload 142 at (D). The detection engine 150 may then calculate a current monitored entropy value and, if appropriate, automatically arrange to trigger a corrective action for the monitored system 140 and/or deployed workload 142 at (E). A used herein, the term "automatically" may refer to a device or process that can operate with little or no human interaction. For example, when the monitored system 140 is associated with a Java system based on a modular system, the corrective action might be associated with replacing a modular software program.

According to some embodiments, devices, including those associated with the system 100 and any other device described herein, may exchange data via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The elements of the system 100 may store data into and/or retrieve data from various data stores (e.g., the storage device 120), which may be locally stored or reside remote from the entropy calculation system 130 and detection engine 150. Although a single entropy calculation system 130 and detection engine 150 are shown in FIG. 1, any number of such devices may be included. Moreover, various devices described herein might be combined according to embodiments of the present invention. For example, in some embodiments, the entropy calculation system 130 and detection engine 150 might comprise a single apparatus. Some or all of the system 100 functions may be performed by a constellation of networked apparatuses, such as in a distributed processing or cloud-based architecture.

A user (e.g., a database administrator) may access the system 100 via a remote device (e.g., a Personal Computer ("PC"), tablet, or smartphone) to view data about and/or manage operational data in accordance with any of the embodiments described herein. In some cases, an interactive graphical user interface display may let an operator or administrator define and/or adjust certain parameters (e.g., to set up or adjust various entropy calculations) and/or provide or receive automatically generated recommendations, results, and/or alerts from the system 100.

Figure 2:
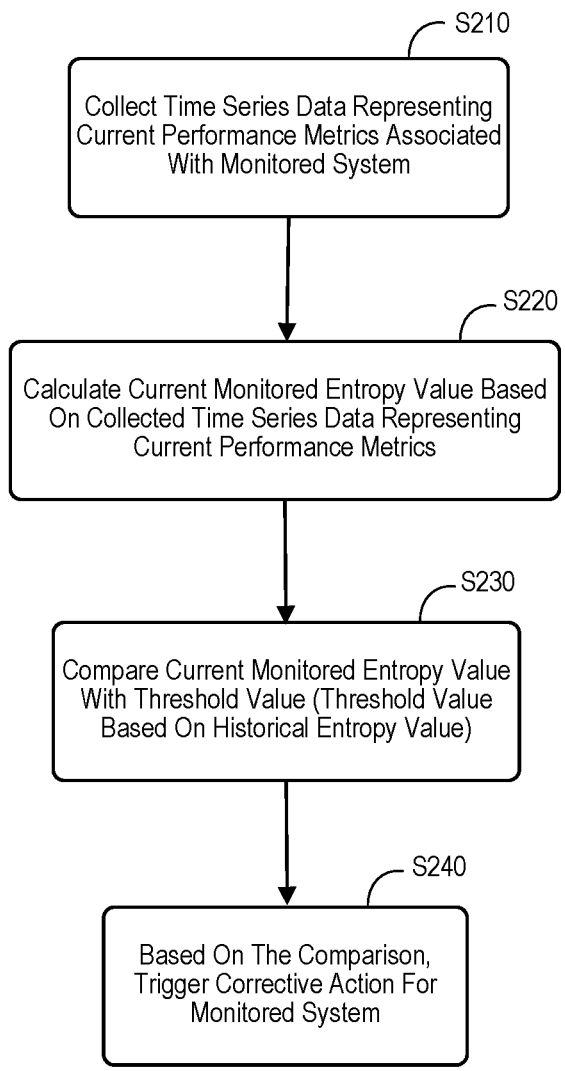
FIG. 2 illustrates a method according to some embodiments.

FIG. 2 illustrates a method to facilitate an automatic determination of entropy values associated with a controller of a cloud computing environment according to some embodiments. The flow charts described herein do not imply a fixed order to the steps, and embodiments of the present invention may be practiced in any order that is practicable. Note that any of the methods described herein may be performed by hardware, software, an automated script of commands, or any combination of these approaches. For example, a computer-readable storage medium may store thereon instructions that when executed by a machine result in performance according to any of the embodiments described herein.

At S210, a detection engine coupled to a monitored system currently executing a deployed workload (in a cloud computing environment) may collect time series data representing current performance metrics associated with the monitored system. The performance metrics might be associated with, for example, Central Processing Unit ("CPU") utilization, memory usage, request latency, Input Output ("IO") performance, etc. At S220, the system may the calculate a current monitored entropy value based on the collected time series data representing current performance metrics.

At S230, the system may compare the current monitored entropy value with a threshold value. The threshold value may be, for example, based on a historical entropy value calculated based on time series data representing performance metrics in a historical managed software system data store. As will be described, the historical entropy value might be associated with approximate entropy, sample entropy, and/or multiscale entropy. Based on the comparison, the system may trigger a corrective action for the monitored system at S240 (e.g., by transmitting an alert signal).

In this way, embodiments may provide runtime "entropy" based software operators for KUBERNETES® (e.g., to improve SLAs). As used herein, the term "entropy" may refer to a value that measures the total freedom of a system to explore microstates (i.e., increasing the number of microstates that are available to be spontaneously explored increases the entropy). Note that this also means that entropy measures uncertainty. That is, the higher the entropy, the more uncertain one is of the instantaneous microstate that a system is actually in. Systems that are somehow prevented from accessing some microstates have structure (and lower entropy as compared to if there was no structure). The higher the entropy means a higher level of system disorder.

In a managed software scenario, providers generally capture the health of a system at certain points in time by using a time series databases such as (an open-source time series database optimized for fast, high-availability storage and retrieval of time series data in fields such as application metrics), etc. Although this presents a snapshot of the system health at a certain point in time or for a window, it does not capture the disorder or entropy introduced into the system as the system runs to serves requests from clients. Thus, the system does not accurately know when the appropriate time is to repair a system (if possible) or to trigger a restart of the entire system (when it is predicted that the system will degrade further). That is, usually approaches do not have an accurate measure as to when to replace a module, trigger say a restart of the system, introduce a blue-green type deployment so that the degradation can be arrested early, etc.

Entropy of a software system may represent how much degradation has happened in the system as it runs. Embodiments described herein apply the concept of entropy to time series data (which is already being captured by the time series tools). This internally translates into how much information there is in the time series data. Two of the most common techniques for applying entropy to time series are:
approximate entropy (used to quantify the amount of regularity and the unpredictability of fluctuations over time series data), and
sample entropy (a modification of approximate entropy used to assess the complexity of time series signals).

These generally quantify the repeatability or predictability present in the data/signal. The more repeatable or predictable the data is, the less entropy it contains. As a result, the lower the value of approximate or sample entropy, the more regular or repetitive the signal is (and a less entropic system tends to be more stable and reliable). That is, random and/or irregular signals tend to have higher values for entropy.

Figure 3:
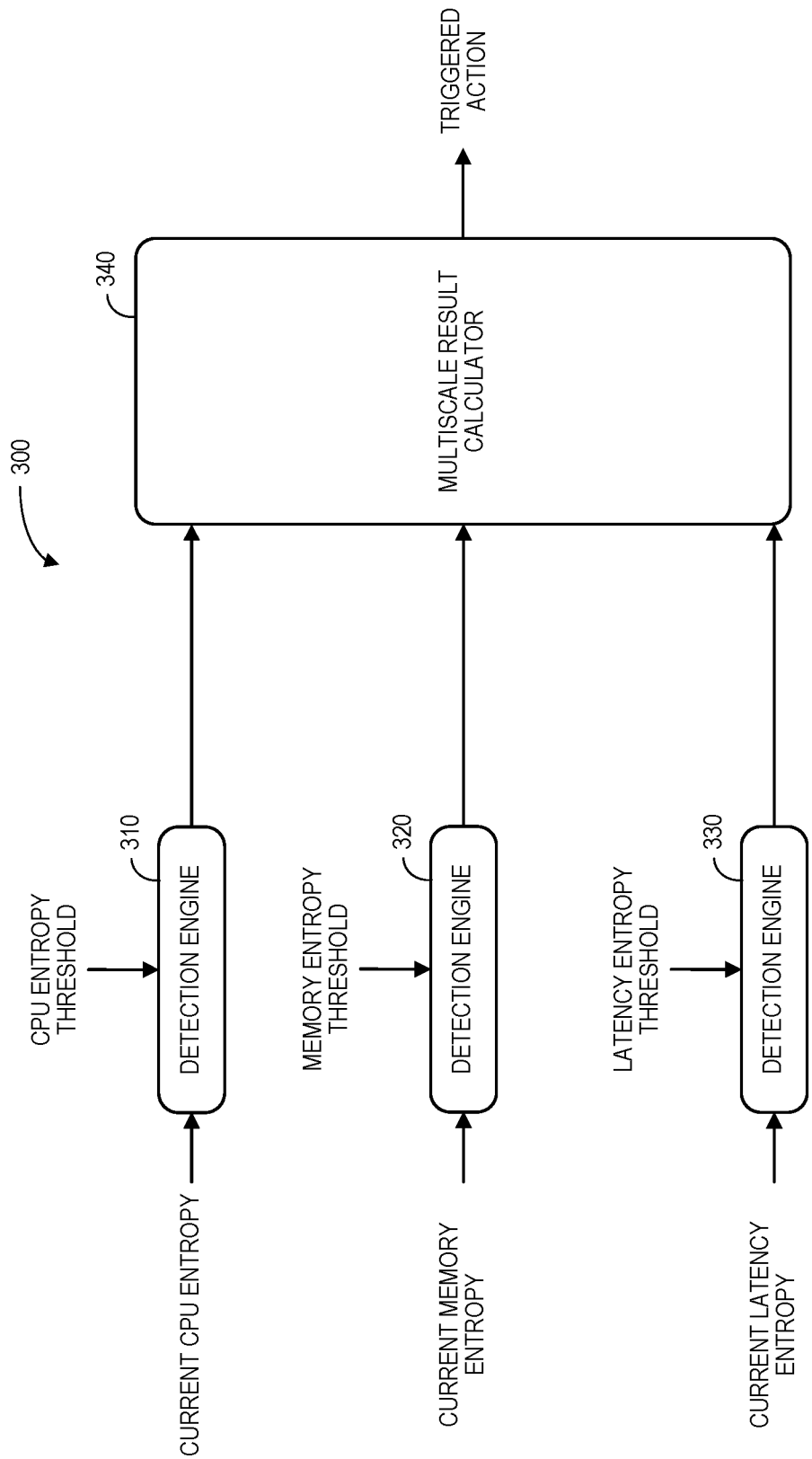
FIG. 3 is a multiscale entropy detection system in accordance with some embodiments.

Some embodiments use another variation of the entropy measurement called the "multiscale" entropy which may be more appropriate for signals whose length is not predetermined. Multiscale entropy may help provide insights into the complexity of fluctuations over a range of time scales. For example, a historical entropy value and current monitored entropy value may be calculated for each of a set of performance metrics, and a corrective action may be performed when a majority of current monitored entropy values cross associated threshold values. FIG. 3 is a multiscale entropy detection system 300 in accordance with some embodiments. The system 300 has: a detection engine 310 that compares a current CPU entropy with a CPU entropy threshold; a detection engine 320 that compares a current memory entropy with a memory entropy threshold; and a detection engine 330 that compares a current latency entropy with a latency entropy threshold. That that embodiments may monitor any other type of performance metric (e.g., IO performance). For each of the CPU, memory, and latency metrics multiscale entropy is captured at different points in time. The system can then derive a threshold value for each of those entropy values based on historical data. When a multiscale result calculator 340 determines that a majority of the entropy values currently exceed the associated threshold, a triggered action maybe generated.

Note that the action triggered by the multiscale result calculator may vary depending on the type of system being monitored. For example:

In a Java system based modular system (such as the Open Services Gateway initiative ("OSGi")), entropy measures for individual modules may be calculated. If a certain module is degrading, it can be replaced with a new OSGi bundle.

Similarly, web assembly modules may be monitored and replaced with new modules when appropriate.

With microservices packaged as Linux processes and/or containers, the action may be to trigger a blue green deployment by starting a new application. Note that when an application is started fresh it will have a low entropy. The blue green deployment may then run in parallel with a higher entropy counterpart for a period of time until a switch to the fresh software is triggered.

Figure 4:
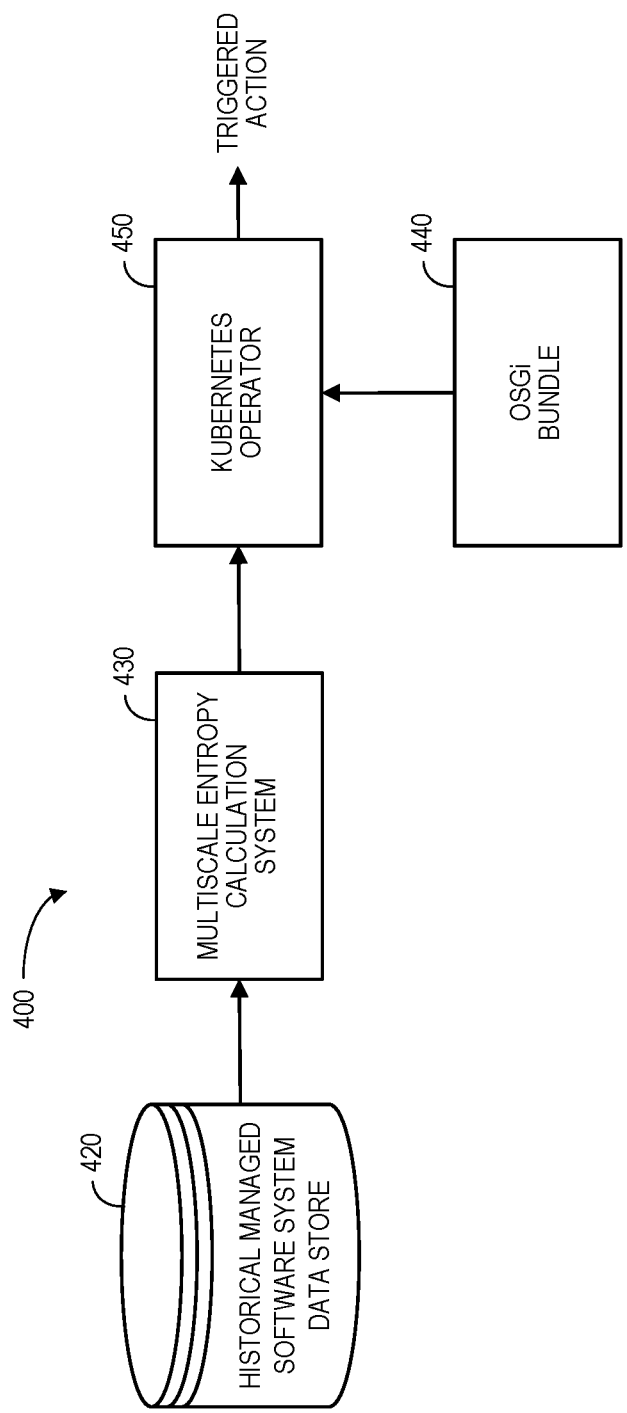
FIG. 4 is a KUBERNETES® entropy detection system according to some embodiments.

Although the embodiments described herein are generic in nature, note that a lot of cloud based applications are moving to KUBERNETES® based systems. FIG. 4 is a KUBERNETES® entropy detection system 400 using an operator according to some embodiments. Similar to FIG. 1, a multiscale entropy calculation system 430 may access time series performance metrics from a historical managed software system data store 420. Based on thresholds generated by the multiscale entropy calculation system 430 and data from an OSGi bundle 440, a KUBERNETES® operator 450 may generate a triggered action. Currently, operators in KUBERNETES manage and control specific software for which the operators are written. These operators generally work on the notion of checking the binary state of a software as to whether a software is running ("1") or not running ("0"). Based on this, it moves the system from an actual state to a desired state. Although these operators serve their purpose to a certain extent, they still work at a very coarse granular level. Embodiments described herein may provide operators that have a finer granular view of the running software. This fine-grained view may be achieved by continuously measuring the entropy of the running software.

At a high level, the KUBERNETES® operator 450 may perform the following:
continuously measure the multiscale entropy of the operated software at different points in time; and
trigger an action once the threshold is reached.

Figure 5:
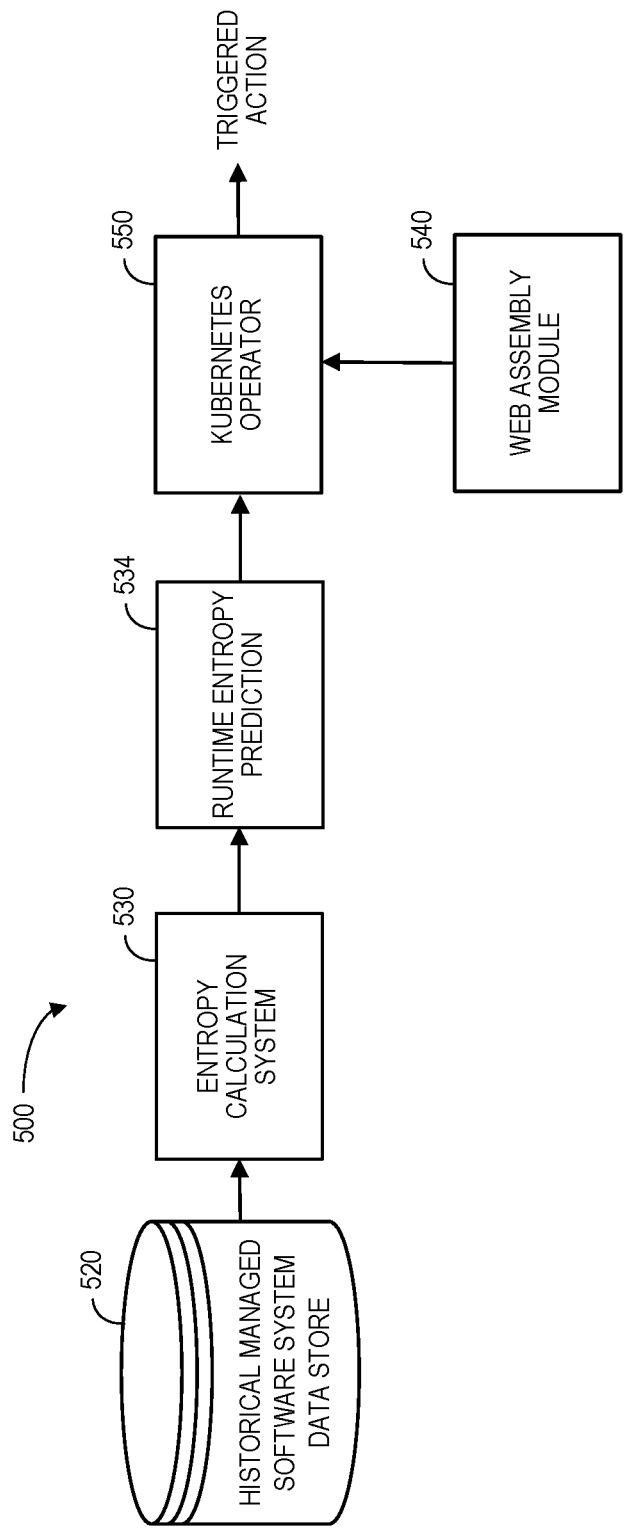
FIG. 5 is a runtime prediction system in accordance with some embodiments.

Instead of just being a reactive system, embodiments described herein may utilize a proactive system to provide a runtime entropy prediction. That is, the system may learn from historical data and try to predict entropies ahead of time. FIG. 5 is a runtime prediction system 500 in accordance with some embodiments. As before, an entropy calculation system 530 may access time series performance metrics from a historical managed software system data store 520. Based on thresholds generated by the entropy calculation system 530 and runtime entropy prediction 534 (as well as data from a web assembly module 540), a KUBERNETES® operator 550 may generate a triggered action. That is, once the system 500 has gathered entropy measurements over a sufficient period of time, an entropy forecasting problem may be solved. Consider, for example, that over a period of time the following entropy measurements are recorded:

$e_1, e_2, e_3, \ldots, e_n$ where e represents entropy at a certain time step. Embodiments may then use a memory based neural network (such as a Long Short-Term Memory ("LSTM") system or a Gated Recurrent Unit ("GRU") system) to develop a learning network that forecasts the values of these entropies few time steps ahead of time. Since the system has entropy measurements of different aspects of the software (e.g., CPU, memory, IO usage, etc.) a multivariate time series representation can be constructed. Since there may be a complex, non-linear relationship between these variables, it may be best to model them using a non-linear mechanism like a multi layered neural network. Examples of input fields might include:
the date;
a CPU entropy measurement;
a memory entropy measurement; and
an IO entropy measurement.

Figure 6:
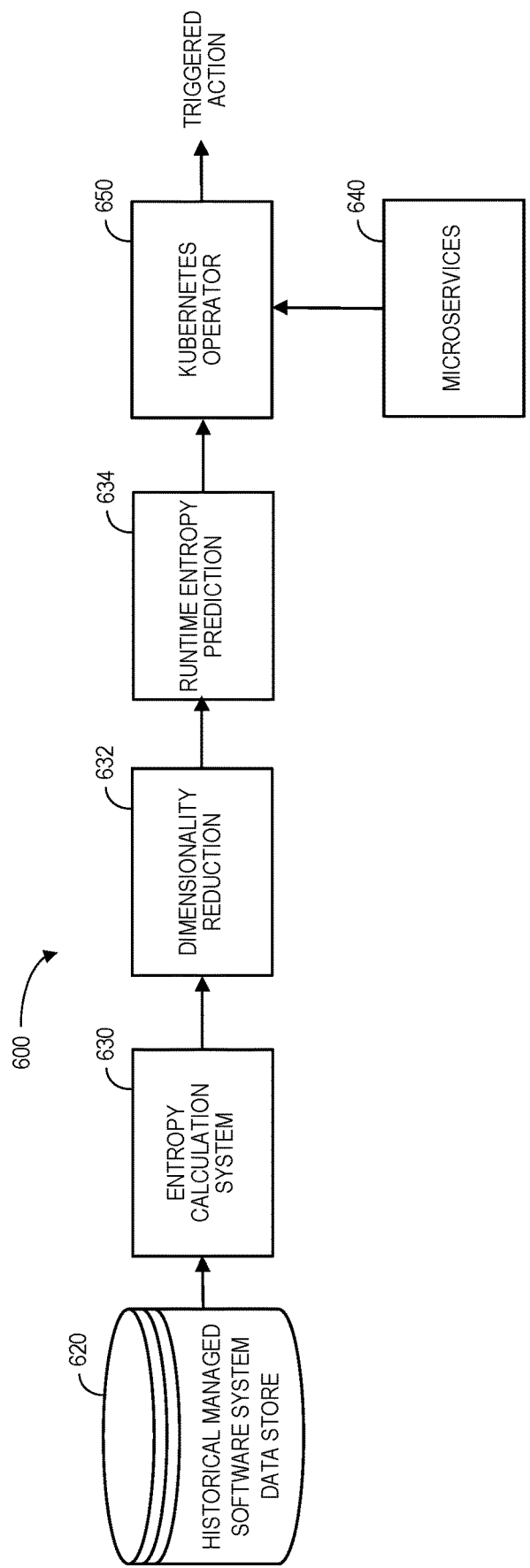
FIG. 6 illustrates a system with dimensionality reduction according to some embodiments.

Instead of training an LSTM system directly, embodiments might first extract a better representations of the time series data for each sequence (e.g., with each sequence representing a time step of 30 minutes). This might be done, for example, using a standard autoencoder (a type of artificial neural network used to learn efficient coding of unlabeled data) to do a dimensionality reduction to learn the latent features of the timeseries data. FIG. 6 illustrates a system 600 with dimensionality reduction according to some embodiments. As before, an entropy calculation system 630 may access time series performance metrics from a historical managed software system data store 620. Based on thresholds generated by the entropy calculation system 630, dimensionality reduction 632, and runtime entropy prediction 634 (as well as data from microservice 640 packages), a KUBERNETES® operator 650 may generate a triggered action.

Figure 7:
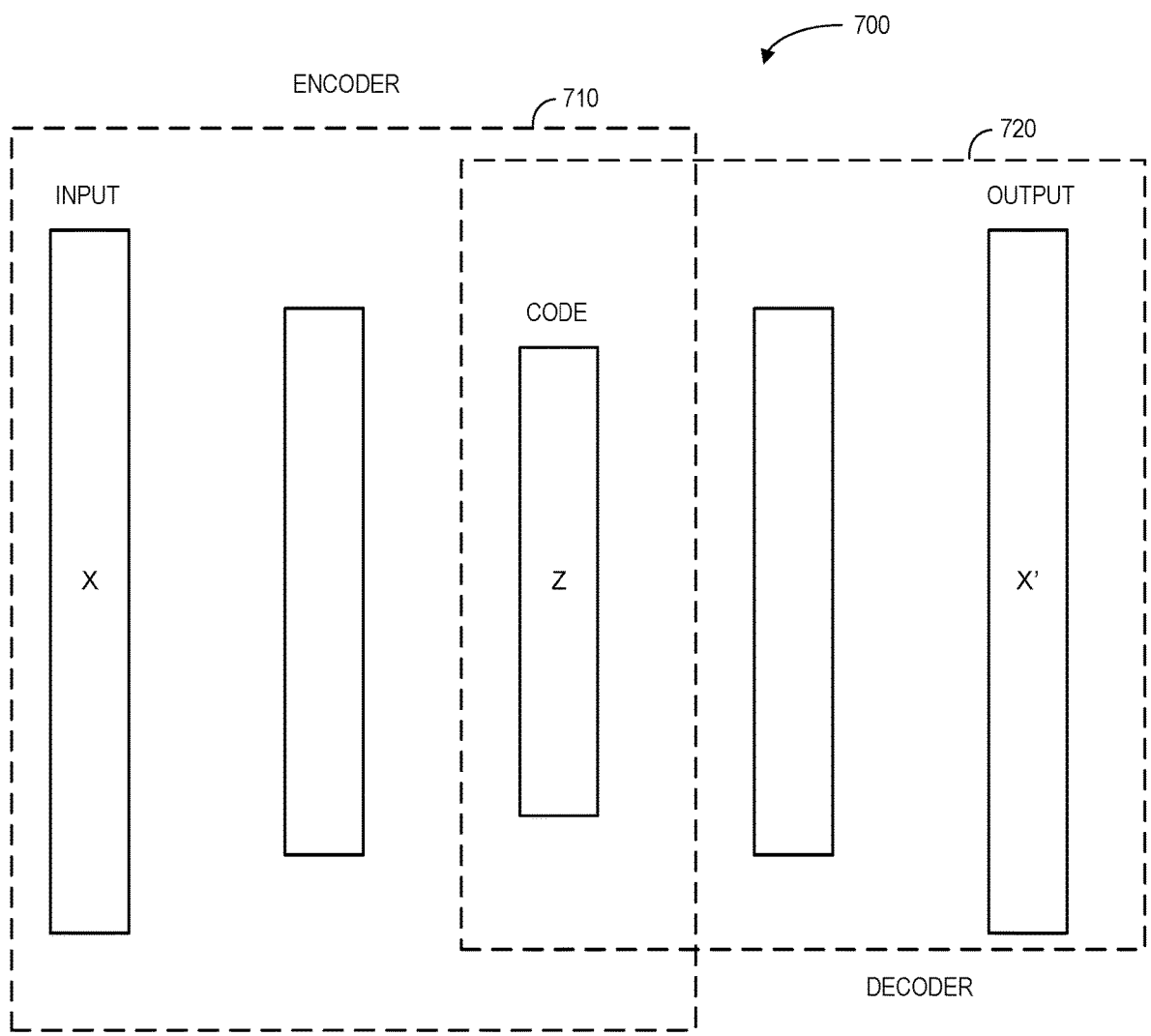
FIG. 7 is an autoencoder in accordance with some embodiments.

FIG. 7 is an autoencoder 700 in accordance with some embodiments. The autoencoder 700 includes an encoder 710 with an input X and a decoder 720 with an output X'. Imagine that the system first passes a time series step of data through the autoencoder 700. The autoencoder hidden layer (Z as shown in FIG. 7) is the layer that learns the latent features of the time series step (e.g., the entropy feature vector). Once the system has the latent features captured for each time step, it may run sequences of those via the LSTM network to make the network learn features of the time series. This network may be trained to predict entropy values in future time steps by learning the patterns present in the time series. The trained networks can then be used by the KUBERNETES® operator to continuously predict entropy vectors (these would be a representation for the CPU, memory entropy, etc.). Once it predicts that these values will cross a defined threshold, an alert can be generated for a course correction (e.g., by triggering an action such as a blue green deployment of a fresh instance of the software as the current one degrades).

Figure 8:
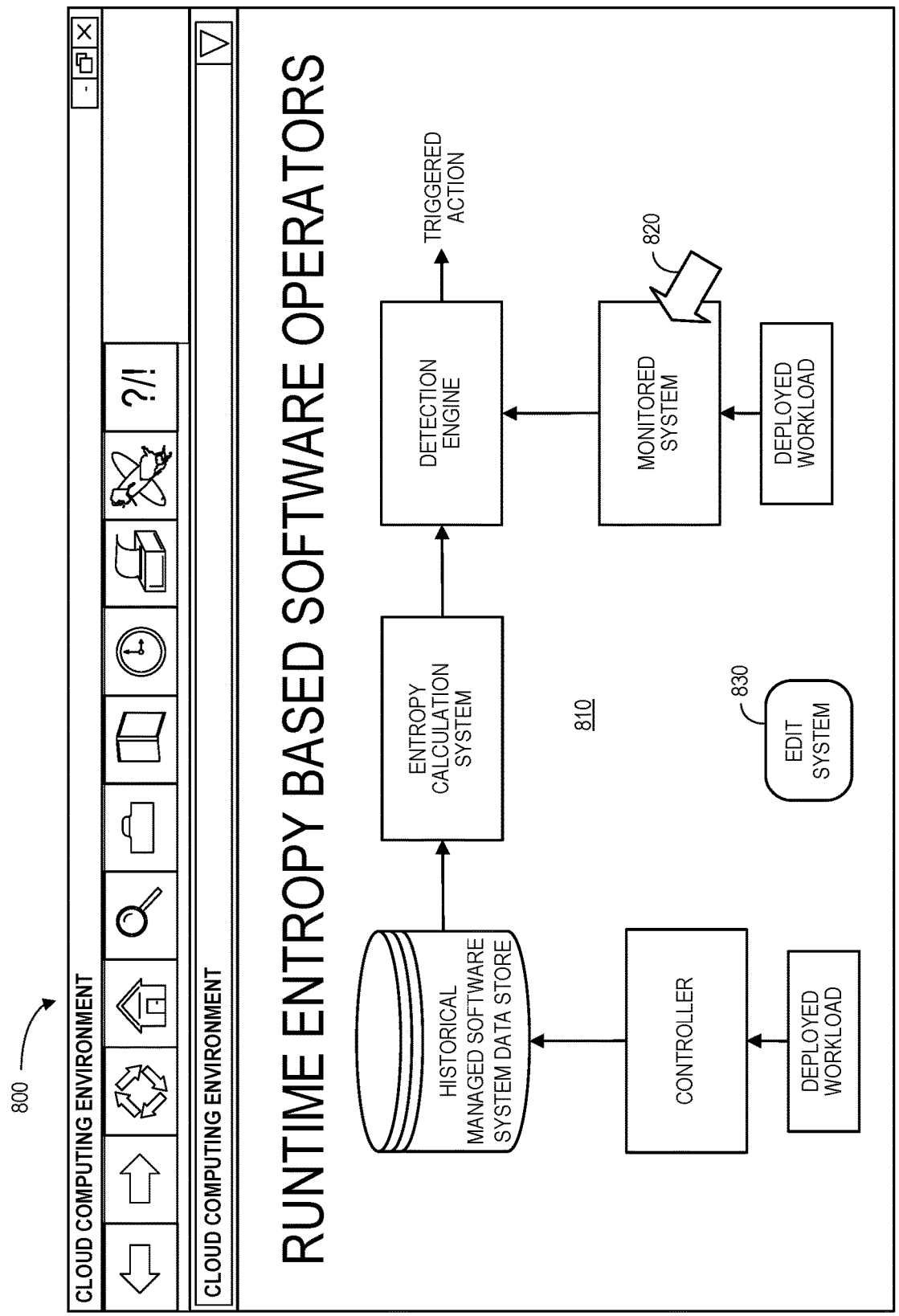
FIG. 8 is a human machine interface display in accordance with some embodiments.

FIG. 8 is a human machine interface display 800 in accordance with some embodiments. The display 800 includes a graphical representation 810 or dashboard that might be used to manage or monitor a runtime entropy based software operator framework (e.g., associated with a cloud provider). In particular, selection of an element (e.g., via a touchscreen or computer mouse pointer 820) might result in the display of a popup window that contains configuration data. The display 800 may also include a user selectable "Edit System" icon 830 to request system changes (e.g., to investigate or improve system performance).

Figure 9:
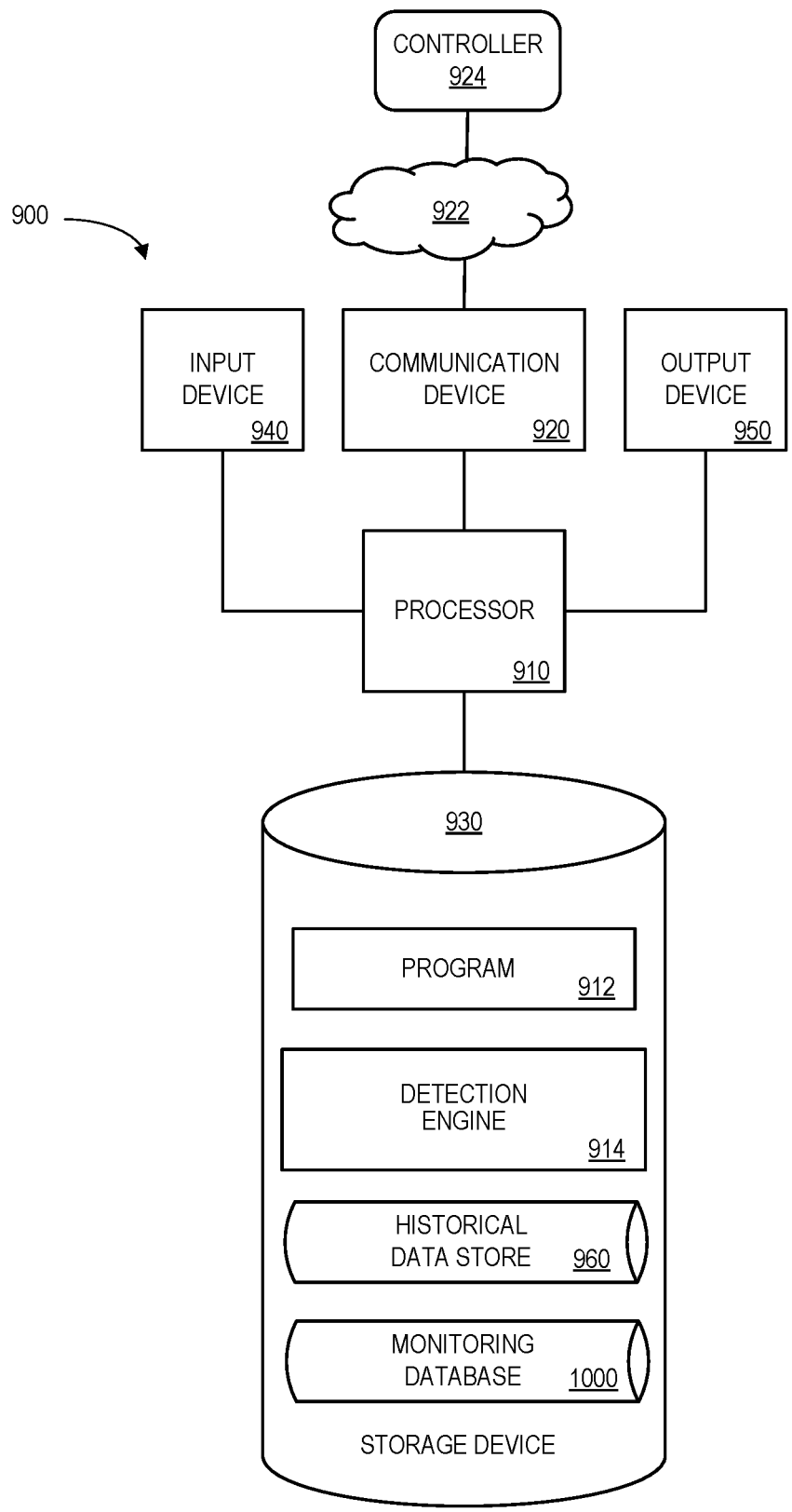
FIG. 9 is an apparatus or platform according to some embodiments.

Note that the embodiments described herein may be implemented using any number of different hardware configurations. For example, FIG. 9 is a block diagram of an apparatus or platform 900 that may be, for example, associated with the system 100 of FIG. 1 (and/or any other system described herein). The platform 900 comprises a processor 910, such as one or more commercially available CPUs in the form of one-chip microprocessors, coupled to a communication device 920 configured to communicate via a communication network (not shown in FIG. 9). The communication device 920 may be used to communicate, for example, with one or more remote user platforms or a controller 924 via a communication network 922. The platform 900 further includes an input device 940 (e.g., a computer mouse and/or keyboard to input data about monitored system or deployed workload preferences) and an output device 950 (e.g., a computer monitor to render a display, transmit recommendations or alerts, and/or create monitoring reports). According to some embodiments, a mobile device and/or PC may be used to exchange data with the platform 900.

The processor 910 also communicates with a storage device 930. The storage device 930 can be implemented as a single database or the different components of the storage device 930 can be distributed using multiple databases (that is, different deployment data storage options are possible). The storage device 930 may comprise any appropriate data storage device, including combinations of magnetic storage devices (e.g., a hard disk drive), optical storage devices, mobile telephones, and/or semiconductor memory devices. The storage device 930 stores a program 912 and/or detection engine 914 for controlling the processor 910. The processor 910 performs instructions of the programs 912, 914, and thereby operates in accordance with any of the embodiments described herein. For example, the processor 910 may facilitate an automatic determination of entropy values associated with a controller 924 of a cloud computing environment. The processor 910 may calculate at least one historical entropy value based on information in a historical data store 960. The processor 910 may also collect time series data representing current performance metrics associated with a monitored system and calculate a current monitored entropy value. The processor 910 can then compare the current monitored entropy value with a threshold value (based on the historical entropy value) and, based on the comparison, trigger a corrective action for the monitored system.

The programs 912, 914 may be stored in a compressed, uncompiled and/or encrypted format. The programs 912, 914 may furthermore include other program elements, such as an operating system, clipboard application, a database management system, and/or device drivers used by the processor 910 to interface with peripheral devices.

As used herein, data may be "received" by or "transmitted" to, for example: (i) the platform 900 from another device; or (ii) a software application or module within the platform 900 from another software application, module, or any other source.

In some embodiments (such as the one shown in FIG. 9), the storage device 930 further stores the historical data store and a monitoring database 1000. An example of a database that may be used in connection with the platform 900 will now be described in detail with respect to FIG. 10. Note that the database described herein is only one example, and additional and/or different data may be stored therein. Moreover, various databases might be split or combined in accordance with any of the embodiments described herein.

Figure 10:
FIG. 10 illustrates a monitoring database in accordance with some embodiments.

Referring to FIG. 10, a table is shown that represents the monitoring database 1000 that may be stored at the platform 900 according to some embodiments. The table may include, for example, entries identifying parameters being monitored in a cloud computing environment. The table may also define fields 1002, 1004, 1006, 1008, 1010 for each of the entries. The fields 1002, 1004, 1006, 1008, 1010 may, according to some embodiments, specify: a monitoring parameter identifier 1002, a performance metric 1004, an entropy threshold 1006, a current entropy value 1008, and a result 1010. The monitoring database 1000 may be created and updated, for example, when new software is monitored, when results 1010 are generated, etc.

The monitoring parameter identifier 1002 might be a unique alphanumeric label or link that is associated with a monitored workload deployed by a KUBERNETES® operator. The performance metric 1004 may indicate what time series data are being monitored (e.g., CPU, memory, IO, etc.). The entropy threshold 1006 may be calculated based on historic performance information of the software and the current entropy value 1008 may be monitored. The current entropy values 1008 exceeds the entropy threshold 1006, the system may generate an alert as illustrated by the result 1010 for "MP102" (that is, the current entropy value 1008 of "0.7" for that data exceeds the entropy threshold 1006 of "0.6").

In this way, embodiments may facilitate an automatic determination of entropy values associated with a controller of a cloud computing environment in an efficient and accurate manner. Since providing SLA and/or SLO may be a prime objective for a cloud operator, embodiments described herein may preempt software degradation and take early corrective action. Embodiments may measure software degradation via entropy measurements and also via the operator model of KUBERNETES®. Using such operators may improve the service level qualities of monitored software.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Figure 11:
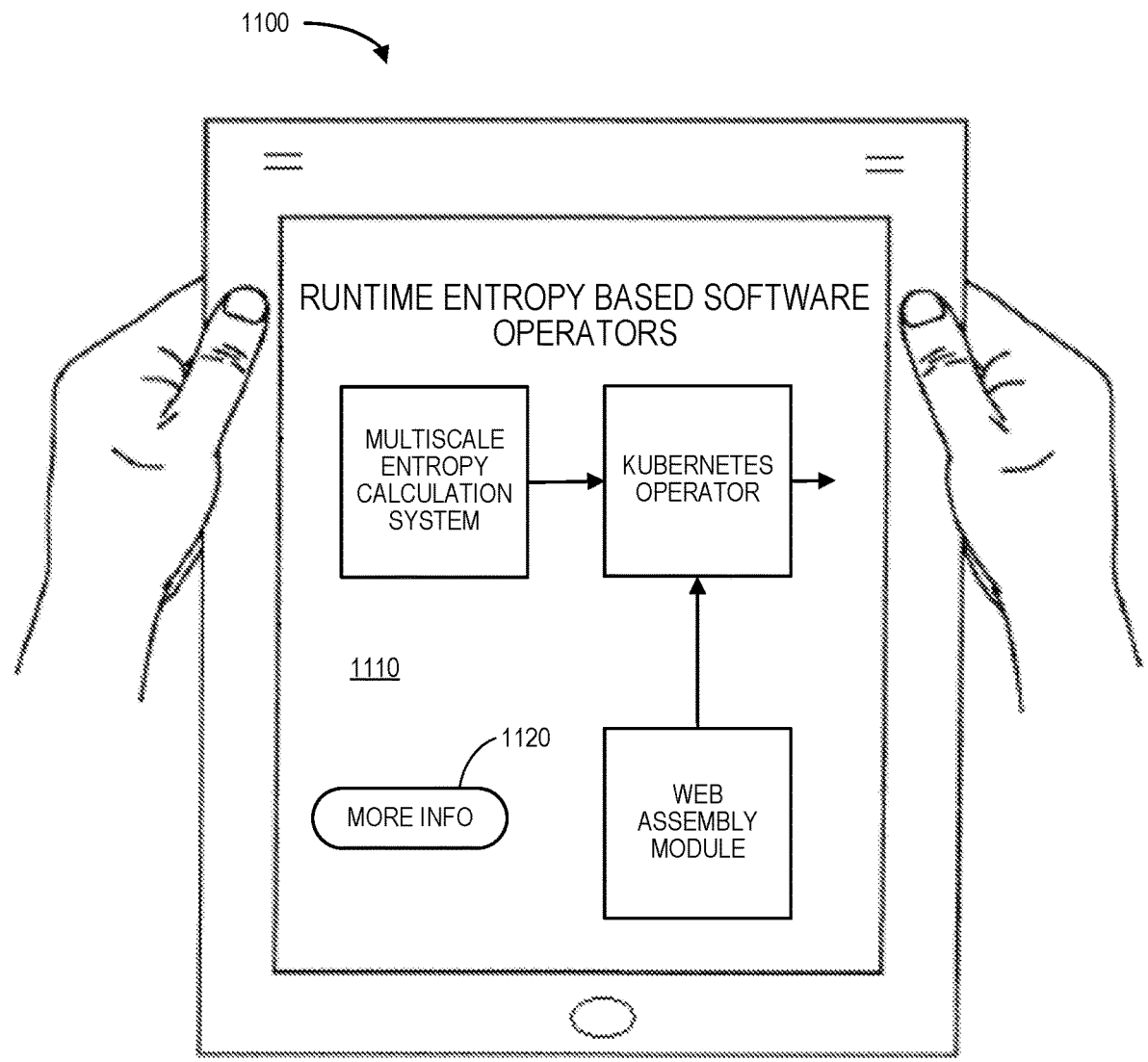
FIG. 11 illustrates a handheld tablet computer according to some embodiments.

Although specific hardware and data configurations have been described herein, note that any number of other configurations may be provided in accordance with some embodiments of the present invention (e.g., some of the data associated with the databases described herein may be combined or stored in external systems). Moreover, although some embodiments are focused on particular types of application errors, any of the embodiments described herein could be applied to other types of application errors. Moreover, the displays shown herein are provided only as examples, and any other type of user interface could be implemented. For example, FIG. 11 shows a handheld tablet computer 1200 rendering a runtime entropy based software operator display 1110 that may be used to view or adjust existing system framework components and/or to request additional data (e.g., via a "More Info" icon 1120).

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

The invention claimed is:

1. A system associated with a cloud computing environment, comprising:
    a historical managed software system data store containing electronic records associated with controllers and deployed workloads, each electronic record including time series data representing performance metrics extracted via an autoencoder that performs dimensionality reduction;
    an entropy calculation system, coupled to the historical managed software system data store, to calculate historical multiscale entropy values, based on information in the historical managed software system data store, associated with (i) Central Processing Unit ("CPU") utilization, (ii) memory usage, and (iii) request latency; and
    a detection engine, coupled to monitored microservices packaged as processes or containers that are currently executing a deployed workload in the cloud computing environment, including:
        a computer processor, and
        a computer memory coupled to the computer processor and storing instructions that, when executed by the computer processor, cause the detection engine to:
        (i) collect time series data representing current performance metrics associated with the monitored microservices,
        (ii) calculate current monitored entropy values, based on the collected time series data, representing current performance metrics associated with (i) CPU utilization, (ii) memory usage, and (iii) request latency,
        (iii) compare the current monitored entropy values with threshold values associated with runtime entropy predictions, the threshold values being based on the historical multiscale entropy values, and
        (iv) based on the comparison, trigger a blue green deployment corrective action for the monitored microservices.

2. The system of claim 1, wherein the performance metrics are further associated with Input Output ("IO") performance.

3. The system of claim 1, wherein the monitored microservices are associated with a Java system based on a modular system and the corrective action is associated with replacing a modular software program.

4. The system of claim 3, wherein the monitored microservices are associated with Open Services Gateway initiative ("OSGi") bundles.

5. The system of claim 1, wherein the corrective action includes transmitting an alert signal.

6. The system of claim 1, wherein the detection engine is associated with a KUBERNETES® operator.

7. The system of claim 1, wherein the runtime entropy prediction is determined via a Long Short-Term Memory ("LSTM") system.

8. A computer-implemented method associated with a cloud computing environment, comprising:
    collecting, by a computer processor of a detection engine coupled to monitored microservices packaged as processes or containers that are currently executing a deployed workload in the cloud computing environment, time series data representing current performance metrics, extracted via an autoencoder that performs dimensionality reduction, associated with the monitored microservices;
    calculating current monitored entropy values, based on the collected time series data, representing current performance metrics, associated with (i) Central Processing Unit ("CPU") utilization, (ii) memory usage, and (iii) request latency;
    comparing the current monitored entropy values with threshold values associated with runtime entropy predictions, the threshold values being based on historical multiscale entropy values calculated using time series data representing performance metrics in a historical managed software system data store; and
    based on the comparison, triggering a blue green deployment corrective action for the monitored microservices.

9. The method of claim 8, wherein the performance metrics are further associated with Input Output ("IO") performance.

10. A system comprising:
    at least one programmable processor; and
    a non-transitory machine-readable medium storing instructions that, when executed by the at least one programmable processor, cause the at least one programmable processor to perform operations comprising:
        collecting, by a computer processor of a detection engine coupled to monitored microservices packaged as processes or containers that are currently executing a deployed workload in the cloud computing environment, time series data representing current performance metrics, extracted via an autoencoder that performs dimensionality reduction, associated with the monitored microservices;
        calculating current monitored entropy values, based on the collected time series data, representing current performance metrics, associated with (i) Central Processing Unit ("CPU") utilization, (ii) memory usage, and (iii) request latency;
        comparing the current monitored entropy values with threshold values associated with runtime entropy predictions, the threshold values being based on historical multiscale entropy values calculated using time series data representing performance metrics in a historical managed software system data store; and based on the comparison, triggering a blue green deployment corrective action for the monitored microservices.

11. The system of claim 10, wherein the monitored microservices are associated with a Java system based on a modular system and the corrective action is associated with replacing a modular software program.

12. The system of claim 10, wherein the monitored microservices are associated with web assembly modules and the corrective action is associated with replacing a web assembly module.

* * * * *